United States Patent [19]

Gee

[11] Patent Number: 4,620,878
[45] Date of Patent: Nov. 4, 1986

[54] METHOD OF PREPARING POLYORGANOSILOXANE EMULSIONS HAVING SMALL PARTICLE SIZE

[75] Inventor: Ronald P. Gee, Midland, Mich.

[73] Assignee: Dow Corning Corporation, Midland, Mich.

[21] Appl. No.: 542,639

[22] Filed: Oct. 17, 1983

[51] Int. Cl.[4] .............................................. C11D 1/82
[52] U.S. Cl. .......................... 106/287.15; 106/287.16; 252/174.15; 252/312
[58] Field of Search ............... 252/312, 174.15; 106/2, 106/287.12, 287.15, 287.16

[56] References Cited

U.S. PATENT DOCUMENTS

| | | | |
|---|---|---|---|
| 3,433,780 | 3/1969 | Cekada et al. | 260/29.2 |
| 3,975,294 | 8/1976 | Dumoulin | 252/354 |
| 4,052,331 | 10/1977 | Dumoulin | 252/312 |
| 4,146,499 | 3/1979 | Rosano | 252/186 |

OTHER PUBLICATIONS

Technical Information No. M-011, "Information About Toray Silicone SF8417 Fluid".

Primary Examiner—Amelia B. Yarbrough
Attorney, Agent, or Firm—Christopher E. Blank

[57] ABSTRACT

A method of preparing fine polyorganosiloxane emulsions with an average particle size of less than 0.3 micron and polyorganosiloxane microemulsions with an average particle size of less than 0.14 micron is described. A translucent oil concentrate is prepared by mixing a polyorganosiloxane which contains polar groups, a surfactant which is insoluble in the polyorganosiloxane, and sufficient water to obtain a translucent mixture. The translucent oil concentrate is then rapidly dispersed in water to form the desired fine emulsion or microemulsion. In general, if the translucent oil concentrate is not transparent a fine emulsion with an average particle size of less than 0.3 micron is obtained; whereas, if the oil concentrate is transparent, a microemulsion with an average particle size of less than 0.14 micron is obtained.

97 Claims, No Drawings

METHOD OF PREPARING POLYORGANOSILOXANE EMULSIONS HAVING SMALL PARTICLE SIZE

BACKGROUND OF INVENTION

This invention relates to fine emulsions of polyorganosiloxanes wherein the average particle size of the polyorganosiloxane in the fine emulsion is less than about 0.3 micron. This invention also relates to microemulsions of polyorganosiloxanes wherein the average particle size of the polyorganosiloxane in the microemulsion is less than 0.14 micron. This invention also relates to a method of preparing such fine emulsions and microemulsions of the oil-in-water type. Such emulsions with small particle size droplets or aggregates are generally translucent or transparent in appearance.

Generally, translucent or transparent emulsions are difficult to prepare. The oil-in-water type microemulsions are generally more difficult to make than the water-in-oil type microemulsions. Only a few, limited examples of polyorganosiloxanes as the oil phase in such translucent or transparent emulsions are known. Rosano in U.S. Pat. No. 4,146,499 (issued Mar. 27, 1979) teaches a method of preparing an oil-in-water microemulsion. Rosano prepared such a microemulsion in a four-step process involving (1) selection of a first surfactant which is just barely soluble in the oil phase; (2) dissolving the selected first surfactant in the oil to be emulsified in an amount effective to yield a milky or lactescent emulsion of the emulsified oil in an aqueous phase; (3) adding the oil with the dissolved first surfactant to the water phase with agitation; and (4) finally, providing a second surfactant in the water phase which is somewhat more soluble in water than the first surfactant to produce a substantially clear microemulsion of oil-in-water. The second surfactant may be either added to the aqueous phase prior to addition of the oil with the dissolved first surfactant or it may be used to titrate the lactescent emulsion prepared in the third step until the desired substantially clear microemulsion is obtained. When a hydrophobic oil, which is not readily dispersed in the aqueous medium, is employed in the method of Rosano it is necessary to first dissolve the hydrophobic oil in a solvent which can be dispersed in the aqueous medium. The hydrophobic oil dissolved in the solvent is then treated as the oil phase in the Rosano method. Rosano (Example 5) described the preparation of a microemulsion of a dimethylpolysiloxane, a hydrophobic oil, dissolved in trichlorotrifluoroethane using polyoxyethylene (20) sorbitan monolaurate as the first surfactant and nonylphenol polyethylene glycol ether as the second surfactant. Microemulsions containing other polyorganosiloxanes are neither described nor taught by Rosano. Nor is it taught that polyorganosiloxane microemulsions can be prepared without first dissolving the polyorganosiloxane in a solvent which can be dispersed in the aqueous medium.

Dumoulin in U.S. Pat. Nos. 3,975,294 (issued Aug. 17, 1976) and 4,052,331 (issued Oct. 4, 1977) teaches the preparation of polyorganosiloxane microemulsions using a surface active composition which comprises by weight (a) 45 to 90 percent of at least one n-alkyl monoether of a polyethylene glycol, containing 4 to 9 —CH$_2$CH$_2$O— units, the n-alkyl radicals containing 5 to 15 carbon atoms; (b) 5 to 35 percent of a sodium dialkylsulphosuccinate, the linear or branched alkyl radicals containing 6 to 12 carbon atoms; (c) 2 to 17 percent of at least one acid selected from oleic, linoleic, linolenic, and ricinoleic acid, and (d) 1.5 to 12 percent of at least one amine selected from triethanolamine and n-hydroxyethylmorpholine. Attempts to prepare microemulsions from polyorganosiloxanes with surfactants other than the described surface active composition failed. The method of Dumoulin can produce microemulsions which contain a maximum of 15 weight percent of the polyorganosiloxane. Also, the method of Dumoulin generally requires significant amounts of the surface active composition to prepare satisfactory microemulsions. Typically the amount of surface active composition required was in the range of about 200 to 1000 parts by weight per 100 parts by weight of the polyorganosiloxane to be microemulsified.

Cekada and Weyenberg in U.S. Pat. No. 3,433,780 (issued Mar. 18, 1969) teach the preparation of colloid suspensions (particle size less than 0.1 micron) of silsesquioxanes of unit formula RSiO$_{3/2}$ where R is a hydrocarbon or substituted hydrocarbon radical containing from 1 to 7 carbon atoms. These suspensions or microemulsions were prepared by adding the appropriate silane to a water-surfactant mixture, with agitation, the amount of silane being (1) less than 10 percent by weight or (2) the silane being added at a rate of less than ten moles of silane per liter per hour. The method of Cekada et al. is limited to the preparation of siloxanes of general formula RSiO$_{3/2}$ only. The procedure of Cekada et al. is an example of emulsion polymerization.

THE INVENTION

This invention relates to a process for preparing a polyorganosiloxane emulsion of the oil-in-water type, said process comprising
(A) forming a translucent oil concentrate by
  (1) mixing a polyorganosiloxane with at least one surfactant where said polyorganosiloxane contains at least one polar radical attached to silicon through Si—C or Si—O—C bonds or at least one silanol radical, where said polyorganosiloxane is liquid at the temperature of mixing, and where at least one of said surfactants is insoluble in said polyorganosiloxane at the temperature of mixing; and
  (2) adding water to the polyorganosiloxane and surfactant mixture of step (1) where water is added in an amount sufficient to produce a translucent oil concentrate; and
(B) forming a polyorganosiloxane emulsion of the oil-in-water type by rapidly dispersing said translucent oil concentrate in water where the average particle size of said polyorganosiloxane in said emulsion is less than about 0.3 microns.

This invention also relates to another process for preparing a polyorganosiloxane emulsion of the oil-in-water type, said process comprising
(A) forming a translucent oil concentrate by mixing a polyorganosiloxane, at least one surfactant, and water where said polyorganosiloxane contains at least one polar radical attached to Si through Si—C or Si—O—C bonds or at least one silanol radical, where said polyorganosiloxane is liquid at the temperature of mixing, where at least one of said surfactants is insoluble in said polyorganosiloxane at the temperature of mixing, and where water is present in an amount sufficient to produce a translucent oil concentrate; and (B) forming a polyorganosiloxane emulsion of the oil-in-water type by rapidly dispersing said translucent oil concentrate in water where the average particle size of said polyorganosiloxane in said emulsion is less than about 0.3 microns.

This invention also relates to an oil concentrate comprising (A) a polyorganosiloxane which contains at least one polar radical attached to Si through Si—C or Si—O—C bonds or at least one silanol radical,
(B) a surfactant which is insoluble in said polyorganosiloxane
where said polyorganosiloxane and said surfactant form an opaque mixture, and
(C) a sufficient amount of water to produce a translucent mixture;
wherein said oil concentrate, when rapidly dispersed in water, will produce a polyorganosiloxane emulsion of the oil-in-water type with an average particle size of said polyorganosiloxane in said emulsion of less than about 0.3 micron.

This invention also relates to a polyorganosiloxane microemulsion of the oil-in-water type consisting essentially of (A) a polyorganosiloxane which contains at least one polar radical attached to Si through Si—C or Si—O—C bonds or at least one silanol radical,
(B) a surfactant which is insoluble in said polyorganosiloxane, and
(C) water
wherein said polyorganosiloxane is the disperse phase and water is the continuous phase, wherein said polyorganosiloxane in said emulsion has an average particle size of less than 0.14 microns and wherein said polyorganosiloxane microemulsion is transparent.

The present invention is practiced by first preparing a translucent, and preferably transparent, oil concentrate. The translucent oil concentrate contains an polyorganosiloxane having at least one polar radical, a surfactant that is insoluble in the polyorganosiloxane, and sufficient water to render the mixture translucent. In general, the order of addition of the components to form the translucent oil concentrate is not critical. One method is to prepare an opaque mixture of the polyorganosiloxane and insoluble surfactant and then add sufficient water to obtain the desired translucent or transparent oil concentrate. Once the amount of water required for a given polyorganosiloxane/surfactant combination is known it may be preferred to prepare the oil concentrate by simply mixing the desired amounts of the three components together. Although the applicant does not wish to be held to theory it is believed that the oil concentrate is an emulsion of the water-in-oil type with a small average particle size. Transparent oil concentrates may be microemulsions of the water-in-oil type.

The oil concentrates may be either used shortly after their preparation or, in many cases, months or even years after their preparation to prepare fine emulsions or microemulsions containing polyorganosiloxane of the oil-in-water type. In general, oil concentrates containing polyorganosiloxanes which readily react with water will not have long term stability. Such oil concentrates should be employed soon after preparation. To prepare the fine emulsions or microemulsions of this invention, the translucent or transparent oil concentrate is rapidly dispersed in water. In general, the more rapid the dispersion of the oil concentrate in water the smaller the average particle size of the resulting emulsion. In general translucent oil concentrates which are visually hazy, when rapidly dispersed in water, give fine emulsion with average particle size less than 0.3 microns. Translucent oil concentrates which are transparent or clear generally yield microemulsions where the average particle size is less than 0.14 microns when rapidly dispersed in water. It is preferred that the oil concentrate is transparent or clear and the emulsion obtained from such an oil concentrate have an average particle size of 0.14 microns or less. Such emulsions are generally referred to as "microemulsions".

The translucent or transparent oil concentrate can be rapidly dispersed in water to form the desired fine emulsion or microemulsion. The oil concentrate may be rapidly dispersed in water in a large number of ways known to the art. For example, on a small scale, the oil concentrate may simply be poured into the water and the mixture rapidly shaken by hand. For larger scale preparations, especially on a commercial scale, mechanical means of rapidly dispersing the oil concentrate in water may be desirable. Such mechanical means may include stirring with various power driven stirrers, ultrasonic mixers, blenders, colloid mills, homogenizers, in-line mixers and pumps. The fine emulsions and microemulsions of this invention may be prepared by batch, semi-continuous, or continuous processes.

It is generally preferred that both the oil concentrate and the emulsions resulting from the oil concentrates be prepared at or close to room temperature. Higher and lower temperatures consistent with liquid water can also be used and in some polyorganosiloxane/surfactant combinations may actually be preferred.

The polyorganosiloxanes useful in this invention must contain at least one polar radical attached to silicon through a silicon-carbon bond or a silicon-oxygen-carbon bond or at least one silanol radical. The polyorganosiloxanes should be liquid at the temperature at which the oil concentrate is prepared. Suitable polar radicals may contain substituents such as amines, amine salts, amides, carbinols, carboxylic acids, carboxylic acid salts, phenols, sulfonate salts, sulfate salts, phosphate acids, and phosphate acid salts, where the polar radical is attached to silicon through silicon-carbon or silicon-oxygen-carbon bonds or the polar radicals may be hydroxyl radicals. Naturally if the polar radical is a hydroxyl radical then the polyorganosiloxane contains silanol radicals or groups. The siloxane unit which contains the polar radical may be illustrated by the general formula

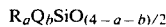

$$R_a Q_b SiO_{(4-a-b)/2}$$

where a is 0 to 2, b is 1 to 3 with the sum of (a+b) being less than or equal to 3, R is a monovalent hydrocarbon or substituted hydrocarbon radical, and Q is a polar radical. The polyorganosiloxane may contain additional siloxane units of general formula $R_c SiO_{(4-c)/2}$ where c is 1 to 3 and R is a monovalent hydrocarbon or substituted hydrocarbon radical. Illustrative of the R radicals that can be present are alkyl radicals such as the methyl, ethyl, propyl, butyl, amyl, hexyl, octyl, decyl, dodecyl, octadecyl, and myricyl radicals; alkenyl radicals such as the vinyl, allyl, and hexenyl radicals; cycloalkyl radicals such as the cyclobutyl and cyclohexyl radicals; aryl radicals such as the phenyl xenyl and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, α,α,α-trifluorotolyl and the dichloroxenyl radicals; the corresponding cyanohydrocarbon radicals such as 2-cyanoethyl, 3-cyanopropyl and cyanophenyl radicals; and the corresponding mercaptohydrocarbon radicals such as mercaptoethyl, mercaptopropyl, mercaptohexyl and mercaptophenyl. It is preferred that R be a hydrocarbon radical containing from 1 to 18 carbon atoms. Especially preferred R radicals are methyl, phenyl, and vinyl radicals.

Preferred polyorganosiloxanes may be illustrated by the general formula

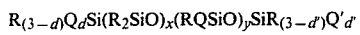

where R is a monovalent hydrocarbon or substituted hydrocarbon radical as defined above, Q is a polar radical attached to Si through Si—C or Si—O—C bonds or the —OH radical and d and d' are, independently 0, 1, 2, or 3. The values of x and y are not particularly limited so long as (y+d+d') is at least one and the sum (x+y) is not so large that the oil concentrate cannot be dispersed in water rapidly enough to obtain an emulsion with an average particle size of less than 0.3 microns. It is preferred, however, that the sum (x+y) be less than about 500 for ease in dispersing the oil concentrate in water. Polyorganosiloxanes having even larger values of (x+y) may be used in this invention if sufficient agitation by mechanical means can be provided so that the viscous oil concentrate may be rapidly dispersed in water in order to obtain an emulsion with an average particle size less than 0.3 microns. It is also preferred that both d and d' are zero so that the polyorganosiloxanes are endblocked with triorganosiloxy units. Again, especially preferred R radicals are methyl, phenyl and vinyl radicals.

Other polyorganosiloxanes may be employed in the practice of this invention so long as they have at least one polar radical attached to silicon through silicon-carbon or silicon-oxygen-carbon bonds or at least one silanol radical. As indicated earlier suitable polar radicals may contain amine, amine salt, amide, carbinol, carboxylic acid, carboxylic acid salt, phenol, sulfonate salt, sulfate salt, phosphate acid, and phosphate salt substituents. The polar radical may also be a hydroxyl radical. Except for the hydroxyl radical, all of the polar radicals should be attached to silicon through a silicon-carbon bond or through silicon-oxygen-carbon bonds. It is preferred that the polar radical be attached to silicon through the Si—C bond. Generally these polar radicals, except for hydroxyl, should have the general formula —R'G where R' is a divalent linking group composed of carbon and hydrogen atoms; carbon, hydrogen, and oxygen atoms; or carbon, hydrogen, and sulfur atoms; and where G is a polar radical. Specific examples of R' include the methylene, ethylene, propylene, hexamethylene, decamethylene, —CH$_2$CH(CH$_3$)CH$_2$—, phenylene, naphthylene, —CH$_2$CH$_2$SCH$_2$CH$_2$—, —CH$_2$CH$_2$OCH$_2$—, —OCH$_2$CH$_2$—, —OCH$_2$CH$_2$CH$_2$—,

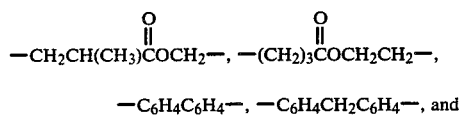

—C$_6$H$_4$C$_6$H$_4$—, —C$_6$H$_4$CH$_2$C$_6$H$_4$—, and

-continued

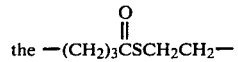

radical. It is preferred that the R' linking group contain from 2 to 10 carbon atoms. It is most preferred that the R' linking group contains from 3 to 4 carbon atoms.

When the polyorganosiloxane is an amine-functional siloxane the polar radical is preferably illustrated by the general formula

wherein R' is the divalent linking group discussed above and R$^2$ is selected from the group consisting of hydrogen atom, alkyl radicals containing from 1 to 4 carbon atoms, and —CH$_2$CH$_2$NH$_2$ radical. The most preferred amine-functional polar radicals are —CH$_2$CH$_2$CH$_2$NHCH$_2$CH$_2$NH$_2$ and —CH$_2$CH(CH$_3$)CH$_2$NHCH$_2$CH$_2$NH$_2$. Salts of these same amine-functional radicals may also be used in the present invention. Examples of such salts include alkyl carboxylate salts, aryl carboxylate salts, halide salts such as chlorides and bromides, and other neutralization products of the amines with organic acids.

Two types of amide-functional polar radicals may be illustrated by the general formulae

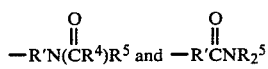

where R' is the divalent linking group discussed above, R$^4$ is a monovalent alkyl radical containing from 1 to 6 carbon atoms, and R$^5$ is selected from the group consisting of hydrogen, alkyl radicals containing from 1 to 4 carbon atoms, and

radicals. Preferably, the amide functional radicals used in the present invention are

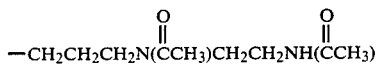

and

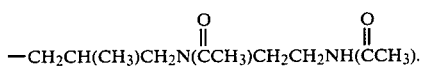

The polar radical on the polyorganosiloxane may also be in the form of a carbinol. In general, examples of suitable carbinol radicals may be represented by the general formula

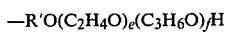

where R' is the divalent linking group discussed above and e and f are both greater than or equal to zero. When both e and f equal zero the carbinol radicals are the simple alcohol radicals —R'OH. When e is greater than zero the carbinol contains an ethylene glycol portion; where f is greater than zero the carbinol contains a propylene glycol portion.

Other suitable polar radicals or substituents include carboxylic acids and their salts. These polar radicals may contain one or more COOH groups or their salts and can generally be expressed by the formula

—R'COOH where R' is the divalent linking group. Examples of the cations capable of forming carboxylic acid salts suitable for use in this invention include $Na^+$, $K^+$, $Li^+$, $NH_4^+$, and pyridinium ions. Preferred carboxylic acid polar radicals include —$CH_2CH_2SCH_2COOH$ and —$CH_2CH_2SCH_2COOX$ where X is selected from the group consisting of $Na^+$, $K^+$, $Li^+$, and $NH_4^+$.

The polar radical may also be of the phenol type expressed by the general formula —$R'C_6H_w(OH)_{5-w}$ where R' is the divalent linking group and where w is 0 to 4. Polyaromatic rings substituted with hydroxyl radicals are also suitable polar substituents for the practice of this invention.

Other polar radicals or substituents suitable for incorporation in the polyorganosiloxanes of this invention include the sulfonic acid salts and sulfate salts. Examples of such polar radicals are illustrated by the general formula

—$R'SO_3X$ for the sulfonic acid salt and

—$R'OSO_3X$ for the sulfate salt where X is a suitable cation such as $Na^+$, $Li^+$, $K^+$, or $NH_4^+$.

The polar radicals may also be in the form of phosphate acids and phosphate acid salts of the general formula

—$R'P(OH)_2O$ or

—$R'P(OX)_2O$, respectively, where X is a suitable cation such as $Na^+$, $Li^+$, $K^+$, $NH_4^+$.

Polyorganosiloxanes which contain silanol radicals, SiOH, may also be emulsified by the method of this invention. Examples of such silanol containing polyorganosiloxanes include linear hydroxyl end-blocked polyorganosiloxane, branched hydroxyl end-blocked copolymers of diorganosiloxane and monoorganosiloxane, as well as polyorganosiloxanes where the hydroxyl radicals are found along the siloxane chain.

The specific recitation of the various polar radicals suitable for incorporation in the polyorganosiloxanes useful in this invention is not intended as a limitation of the invention. As one skilled in the art would realize polar radicals containing amines, amine salts, amides, carbinols, carboxylic acids, carboxylic acid salts, phenols, sulfonate salts, sulfate salts, phosphate acids, and phosphate acid salts, as well as hydroxyl radicals other than those specifically described herein would be suitable polar radicals for the polyorganosiloxanes of this invention. It will also be realized by one skilled in the art that the polyorganosiloxanes suitable for use in this invention may have more than one type of polar radical in the molecule. One skilled in the art should also realize that polyorganosiloxanes which have more than one type of polar radical in a single substituent would also be suitable for use in this invention.

As indicated earlier the polyorganosiloxane must have at least one polar radical. It is preferred that the polyorganosiloxanes have from about 1 to 15 molar percent of the described polar radicals and most preferably from about 2 to 10 molar percent of the described polar radical. Emulsions of polyorganosiloxanes containing more than 15 molar percent polar radical may be prepared by the process of this invention but the cost of such emulsions would significantly reduce their use in commerce.

The polar radical containing polyorganosiloxanes useful in the present invention can be prepared by procedures well known in the art. Many of these polyorganosiloxanes are available commercially. Therefore their preparation will not be described here.

Polyorganosiloxane which do not contain polar radicals may also be emulsified in the presence of polar radical containing polyorganosiloxanes by the procedures of this invention. The amounts of the non-polar radical containing polyorganosiloxane that may be emulsified is usually limited to a maximum of about 30 weight percent based on the total polyorganosiloxane present. If such non-polar radical containing polyorganosiloxane are to be incorporated into the emulsions of this invention they should be added along with and at the same time as the polar radical containing polyorganosiloxane in the oil concentrate.

The oil concentrate is prepared by mixing the desired polar radical containing polyorganosiloxane, at least one surfactant that is insoluble in the polar radical containing polyorganosiloxane, and sufficient water to obtain a translucent or transparent mixture. The insoluble surfactant may be anionic, cationic, nonionic, or amphoteric in nature. Generally nonionic surfactants are preferred. Solubility may be determined by a simple test. A small amount (fraction of a gram) of the surfactant is added to a few milliliters of the polyorganosiloxane oil. If the surfactant is insoluble, a cloudy suspension will result; if the surfactant is soluble the solution will be clear. Generally, for the surfactant to be insoluble in most polar group containing polyorganosiloxane oils the hydrophilic-lipophilic balance (HLB) of the surfactant should be greater than about eight. This HLB value is given only as a guideline for initial selection of suitable surfactants and not as a limitation of the invention. For certain polar radical containing polyorganosiloxane, surfactants with an HLB value of less than 8 may be insoluble therein and produce emulsions with average particle sizes less than 0.3 microns by the procedures of this invention. In other words, the insolubility of the surfactant in the polyorganosiloxane oil is the critical factor rather than the HLB value.

The insoluble surfactants useful in this invention are generally well known and available in commerce. These well known surfactants include the sorbitan esters of fatty acids having 10 to 22 carbon atoms; polyoxyethylene sorbitan esters of $C_{10}$ to $C_{22}$ fatty acids having up to 95 percent ethylene oxide; polyoxyethylene sorbitol esters of $C_{10}$ to $C_{22}$ fatty acids, polyoxyethylene derivatives of fatty phenols having 6 to 20 carbon atoms and up to 95 percent ethylene oxide; fatty amino and amido betaines having 10 to 22 carbon atoms; polyoxyethylene condensates of $C_{10}$ to $C_{22}$ fatty acids or fatty alcohols having up to 95 percent ethylene oxide; ionic surfactants such as the alkylaryl sulfonates of 6 to 20 carbons in the alkyl group; $C_{10}$ to $C_{22}$ fatty acids soaps; $C_{10}$ to $C_{22}$ fatty sulfates; $C_{10}$ to $C_{22}$ alkyl sulfonates; alkali metal salts of dialkyl sulfosuccinates; $C_{10}$ to $C_{22}$ fatty amine oxides; fatty imidazolines of $C_6$ to $C_{20}$ carbon atoms; fatty amido sulfobetaines having 10 to 22 carbon atoms; quaternary surfactants such as the fatty ammonium compounds having 10 to 22 carbon atoms; $C_{10}$ to $C_{22}$ fatty morpholine oxides; alkali metal salts of carboxylated ethoxylated $C_{10}$ to $C_{22}$ alcohols having up to 95 percent ethylene oxide; ethylene oxide condensates of $C_{10}$ to $C_{22}$ fatty acid monoesters of glycerins having up to 95 percent ethylene oxide; the mono- or diethanol amides of $C_{10}$ to $C_{22}$ fatty acids; and alkoxylated siloxane surfactants containing ethylene oxide units and/or propylene oxide units; and phosphate esters, etc. As is well known in the field of surfactants, the counter ion in the case of anionic surfactants may be any of the alkali metals, ammonia, or substituted ammonias such as trimethylamine or triethanol amine. Usually ammonium, sodium and potassium are preferred. In the case of cationic surfactants, the counter ion is usually a halide, sulfate, or methosulfate, the chlorides being the most common industrially available compounds. The foregoing compounds have been described with particular reference to fatty derivatives. It is the fatty moiety usually forming the lipophilic moiety. A common fatty group is an alkyl group of natural or synthetic origin. In most instances, the alkyl group may be replaced by the corresponding ethylenically saturated group having one or more ethylene linkages such as commonly occur in nature. Common unsaturated groups are oleyl, linoleyl, decenyl, hexadecenyl, dodecenyl, etc. In appropriate cases, as known in the art, the alkyl group may be cyclic, i.e., cycloalkyls, or may be straight or branched chain. When a single nonionic surfactant is employed as the insoluble surfactant, the cloud point of the surfactant should be higher than the temperature at which the emulsion is prepared. It appears that such nonionic surfactants (i.e. with low cloud points) may be used if other surfactants which are also insoluble and have high cloud points are also present. Other suitable surfactants include sorbitol monolaurate-ethylene oxide condensates; sorbitol monomyristate-ethylene oxide condensates; sorbitol monostearate-ethylene oxide condensates; dodecylphenol-ethylene oxide condensates; myristylphenol-ethylene oxide condensates; octylphenyl-ethylene oxide condensates; nonylphenyl-ethylene oxide condensates; stearylphenol-ethylene oxide condensates; lauryl alcohol-ethylene oxide condensates; stearyl alcohol-ethylene oxide condensates; secondary alcohol-ethylene oxide condensates such as $C_{14}-C_{15}$ secondary alcohols condensed with ethylene oxide; decyl amino betaine; coco amido sulfobetaine; oleyl amido betaine; coco imidazoline; coco sulfoimidazoline; cetyl imidazoline; 1-hydroxyethyl-2-heptadecenyl imidazoline; 1-hydroxyethyl-2-mixed heptadecenyl heptadecadienyl imidazoline; n-coco morpholine oxide; decyl dimethyl amine oxide; coco amido dimethyl amine oxide; sorbitan tristearate condensed with ethylene oxide; sorbitan trioleate condensed with ethylene oxide; sobitan trioleate; sodium or potassium dodecyl sulfate; sodium or potassium stearyl sulfate; sodium or potassium dodecyl benzene sulfonate; sodium or potassium stearyl sulfonate; triethanol amine salt of dodecyl sulfate; trimethyl dodecyl ammonium chloride; trimethyl stearyl ammonium methosulfate; sodium laurate; sodium or potassium myristate; and sodium or potassium stearate.

Surfactants preferred for the practice of this invention include the octylphenoxy polyethoxy ethanols, nonionic surfactants with varying amounts of ethylene oxide units available from Rohm and Haas Company, Philadelphia, Pa. under the general Triton tradename; trimethylnonyl polyethylene glycol ethers and polyethylene glycol ethers of linear 11-15 carbon atoms containing alcohols, available from Union Carbide Corporation, New York, N.Y. under the general tradename Tergitol; the nonionic ethoxylated tridecyl ethers, available from Emery Industries, Mauldin, S.C. under the general tradename Trycol; alkali metal salts of dialkyl sulfosuccinates, available from American Cyanamid Company, Wayne, N.J. under the general tradename Aerosol; polyethoxylated quaternary ammonium salts and ethylene oxide condensation products of the primary fatty amines, available from Armak Company, Chicago, Ill. under the general tradenames Ethoquad and Ethomeen, respectively; and alkoxylated siloxane surfactants containing ethylene oxide and/or propylene oxide groups. These preferred surfactants may also be obtained from other suppliers under different tradenames.

As one skilled in the art would realize, not all surfactants of a given class of sufactants described above will be suitable as the primary surfactant in the practice of this invention. Some of the surfactants of a given series may be soluble in the siloxane oil of interest and, therefore, would not be suitable for use as the only surfactant or primary surfactant in the emulsions of this invention. Other surfactants may have cloud points that are too low or have other properties that do not allow for the formation of a translucent oil concentrate. The Triton series of nonionic surfactant can be used to illustrate this point. Triton X15 and X35 are soluble in most, if not all, of the polyorganosiloxane oils of this invention and therefore are not suitable as the only surfactant in the oil concentrate. Triton X100, as well as others in the series, are insoluble in most polyorganosiloxane oils of this invention and are very satisfactory for use in the practice of this invention.

Other surfactants, in addition to the one required surfactant which is insoluble in the polyorganosiloxane oil, may also be present in the oil concentrate or fine emulsion or microemulsion of this invention. The required insoluble surfactant will be referred to as the "primary surfactant" while the other surfactants will be referred to as "secondary surfactants". These secondary surfactants may be employed, among other things, to improve the stability of the oil concentrate, to improve the stability of the fine emulsion or microemulsion, or to allow for smaller average particle size of the final emulsion. The secondary surfactants may be added at the same time the primary surfactant is added to form the oil concentrate, or they may be added to the oil concentrate after it has been prepared, or they may be added to the dilution water before the oil concentrate is rapidly dispersed therein, or they may be added to the final fine emulsion or microemulsion. If the secondary surfactant is added to the translucent oil concentrate and the resulting oil concentrate turns cloudy then additional water should be added to form a translucent oil concentrate once again. The secondary surfactants may be anionic, cationic, nonionic, or amphoteric. The secondary surfactant or surfactants may be either soluble or insoluble in the polyorganosiloxane oil. In general, the secondary surfactants are the same general types of surfactants given in the rather extensive lists of primary surfactants. If an insoluble surfactant is used as a secondary surfactant in the oil concentrate, it is not important which surfactant is labeled as the primary or secondary surfactant. Both in fact could be considered as the primary surfactant. All that is required is that at least one insoluble surfactant be present in the clear oil concentrate.

The amount of primary surfactant in the oil concentrate should normally be in an amount to provide at least a monomolecular layer of surfactant for the polyorganosiloxane in the dispersed phase. Lower levels, down to about 80 percent of a monomolecular layer, of the primary surfactant may be used but emulsions produced from such oil concentrate may be less satisfactory. Naturally, levels of the primary surfactant in excess of the one monomolecular layer may be used and, indeed, are preferred. As one skilled in the art realizes the amount of primary surfactant sufficient for monomolecular layer coverage will depend on the particle size of the polyorganosiloxane droplets, the particle size distribution, and the surface area occupied by the surfactant molecule at the interface of the aqueous and dispersed phases. In general, the smaller the average particle size of the polyorganosiloxane in the emulsion the more surfactant needed to form a monomolecular layer. Generally, the amount of primary surfactant should preferably be in the range of about 10 to 200 parts by weight per 100 parts by weight of polyorganosiloxane. Most preferably, the amount of primary surfactant should be in the range of about 20 to 40 parts by weight per 100 parts by weight of polyorganosiloxane.

The amount of water used in the oil concentrate is that amount sufficient to produce a translucent oil concentrate. The amount of water needed to form a clear concentrate will depend upon the specific polyorganosiloxane and surfactant used as well as their relative amounts. Typically, the amount of water required to form a translucent oil concentrate will be in the range of 4 to 30 parts by weight per 100 parts by weight polyorganosiloxane. Specific polyorganosiloxane and surfactant combinations may require more or less water to form a translucent oil concentrate than these general guidelines suggest.

The translucent or transparent oil concentrate is rapidly dispersed in water to form fine emulsions with average particle sizes of less than 0.3 microns or microemulsions with average particle sizes of less than 0.14 microns. The amount of dilution water that the oil concentrate is rapidly disperse into is not critical so long as (1) there is sufficient dilution water so that the resulting emulsion is an oil-in-water type and (2) the resulting emulsion has sufficient stability for its intended use. Emulsions may be prepared by the methods of this invention which contain from about 5 percent to 55 percent by weight of the polyorganosiloxane based on the total weight of the emulsion. Preferably, the emulsions of this invention contain about 10 to 40 weight percent of the polyorganosiloxane based on the weight of the total emulsion. Emulsions may be prepared with even less of the polyorganosiloxane but such emulsion may prove economically unattractive.

The fine emulsions prepared by the methods of this invention are generally translucent in nature with an average particle size of less than 0.3 microns. The microemulsions prepared by the methods of this invention are generally transparent in appearance with an average particle size of less than 0.14 microns. Because of the very small particle size, these emulsions should be advantageous in the preparation of clear silicone containing products, as additives to clear aqueous solutions, and in cases where superior emulsion stability is desired. The emulsion of this invention may be used in cosmetics and personal case products such as hand and face lotions, creams, shampoos, hair rinses and conditioners, shaving lotions and creams, etc; in polishes and waxes; and in floor cleaners and sanitizers. Such emulsions may also be used to treat leather and textile goods. Other uses will be apparent to those skilled in the art.

The following examples are given by way of illustration and not by way of limitation. "Parts" in the example, unless indicated otherwise, means "parts by weight". Percentages, unless indicated otherwise, are percentages by weight. Particle size determinations were done on a Malvern RR102 Spectrometer fitted with a M2000 correlator and a 632.8 nm laser light source using the principle of quasi-elastic light scattering and the cumulant method of D. E. Koppel [*J. Chem. Phys.*, 57, 4814(1972)]. Both the oil concentrates and emulsions were examined in an one ounce vial for visual appearance.

EXAMPLE 1

This example shows the preparation of a microemulsion of an amino-functional silicone by several different procedures. The amino-functional silicone can be described by the general formula

where Q is the monovalent polar radical $-CH_2CH(CH_3)CH_2NHCH_2CH_2NH_2$.

In the first method, a mixture of 18 parts water and 1.4 parts of the nonionic surfactant Triton X405 (octylphenoxy polyethoxy (40) ethanol, 70 percent in water from Rohm and Haas Co., Philadelphia, Pa.) was stirred with an air stirrer at 350 rpm. To this stirred mixture was added 100 part of the amino-functional silicone over a four minute period which produced an opaque mixture. To this opaque mixture was added, via a syringe pump, the nonionic surfactant Tergitol TMN-6 (a trimethyl nonyl polyethylene glycol ether from Union Carbide Corp., New York, N.Y.) at a rate of 0.4 ml/min. Stirring was continued throughout the addition process. After addition of about 20 parts of TMN-6 the solution became translucent. Addition was continued until 29 parts of TMN-6 had been added. The final solution (the oil concentrate) remained translucent and contained about 67 percent silicone oil.

The oil concentrate was rapidly dispersed in a large volume of water (about 2000 parts) by adding the oil concentrate to the water in a vial and shaking the vial by hand. A translucent blue microemulsion containing about 5 percent siloxane oil with an average particle size of about 0.09 microns was obtained.

A second method was employed to prepare a similar microemulsion using the same silicone oil and surfactants. One hundred parts of the amino-functional silicone were placed in a beaker equipped with an air stirrer operating at 350 rpm. The Tergitol TMN-6 surfactant (29 parts) was added over a one minute period. The resulting mixture was opaque. The Triton X405 surfactant (1.4 parts) was added to the mixture which remained opaque. The oil concentrate was prepared by adding 18 parts water to the silicone oil/surfactant mixture over a two minute period. After about half of the water had been added the mixture began to clear; after about one-half to one-third of the water had been added the oil concentrate was clear and remained clear after all the water was added. The clear oil concentrate was visually identical to the oil concentrate prepared by the first procedure outlined above. After stirring the oil concentrate for 15 minutes, a few drops of the oil concentrate was added to a vial of water (equivalent to 2000 parts water per 100 parts silicone oil) and mixed by hand. A translucent microemulsion was obtained.

The oil concentrate prepared by the second method was clear and capable of forming a microemulsion after storage at room temperature for at least two months. After about 4 months storage the oil concentrate separated into three layers and was no longer capable of forming a microemulsion.

EXAMPLE 2

One hundred parts of the silicone oil described in Example 1, 29 parts of Tergitol TMN-6, and 1.4 parts of Triton X405 were mixed to form an opaque mixture. Water was added slowly with agitation until 18 parts of water had been added and the mixture was clear. A few drops of the oil concentrate was gently added to water in a vial to obtain about 5 percent silicone oil emulsions. After addition of the oil concentrate the vials were shaken by hand after varying time delays. The average particle size of the silicone oil droplets was determined as a function of the time delay between addition of the oil concentrate and dispersion of the oil concentrate in the water.

| Time Delay (Sec) | Particle Size (Microns) |
| --- | --- |
| 5 | 0.075 |
| 10 | 0.102 |
| 45 | 0.181 |

With time delays of less than or equal to ten seconds a microemulsion was obtained. With a time delay of 45 seconds only a fine emulsion was obtained. Thus it appears that the smallest average particle size is obtained when the delay between addition of the oil concentrate to water and dispersion of the oil concentrate in the water is kept to a minimum.

EXAMPLE 3

The oil concentrate (2.2 g) of Example 2 was dispersed rapidly in 27.8 g of $H_2O$ at both 23° C. and 31° C. At 23° C. a microemulsion was obtained with an average particle size of 0.079 microns. At 31° C. a microemulsion was also obtained but it was not as clear as that formed at 23° C.

EXAMPLE 4

An opaque mixture was obtained with 100 parts of the amino-function silicone oil of Example 1 and 28.6 parts of Tergitol TMN-6 surfactant. Oil concentrates were prepared by adding varying amounts of water to the opaque mixture. The appearance of the resulting oil concentrate was noted and the oil concentrate was then added, with agitation, to 2000 parts of water to prepare an emulsion. The average particle size of the resulting emulsion was determined.

| Run No. | Parts $H_2O$ added to oil concentrate | Appearance of oil concentrate | Average particle size (microns) |
| --- | --- | --- | --- |
| 1 | 0 | opaque | — |
| 2 | 3 | opaque | 1.8 |
| 3 | 6 | opaque | 0.290 |
| 4 | 10 | hazy-blue | 0.115 |
| 5 | 15 | clear | 0.048 |
| 6 | 20 | clear | 0.048 |
| 7 | 25 | clear | 0.099 |
| 8 | 30 | clear-blue | 0.153 |
| 9 | 35 | opaque | 0.218 |
| 10 | 45 | white | 0.216 |
| 11 | 1871 | white | 0.219 |

In run 11 all of the water required to form a 5 percent silicone emulsion was added to the oil concentrate in a continuous manner. Therefore, in run 11 the oil concentrate was not rapidly dispersed into water to form the final 5 percent silicone emulsion.

EXAMPLE 5

A clear (colorless) oil concentrate was prepared by treating an opaque mixture containing 100 parts of the amino-functional silicone of Example 1 and 25 parts of Tergitol TMN-6 with 15 parts of water. Aliquots of the oil concentrate were added, with rapid dispersion, to varying amounts of water to form emulsions containing varying amounts of silicone.

| Percent Silicone Oil in Final Emulsion | Average Particle Size (Microns) |
| --- | --- |
| 5 | 0.088 |
| 10 | 0.082 |
| 20 | 0.082 |
| 30 | 0.080 |
| 40 | 0.087 |

All samples formed microemulsions where the particle sizes appeared to be virtually independent of the amount of silicone oil in the system.

EXAMPLE 6

Several emulsions similar to those described in Example 5 were prepared except that the amount of the surfactant was significantly reduced. A clear oil concentrate was prepared by adding 23 parts of water to an opaque mixture containing 100 parts of the amino-functional silicone of Example 1 and 13 parts of Tergitol TMN-6 surfactant. The oil concentrate was added to 2000 parts of water with rapid dispersion. The resulting clear blue emulsion (about 5 percent silicone) had an average particle size of 0.110 microns. A translucent oil concentrate was prepared from 100 parts of the amino-functional silicone of Example 1, 10 parts of Tergitol TMN-6, and 22 parts water. Upon rapidly dispersing this translucent oil concentrate in about 2000 parts water, a translucent fine emulsion, with an average particle size of 0.19 microns, was obtained.

EXAMPLE 7

Several oil concentrates were prepared by adding varying amounts of water to an opaque mixture of 100 parts of the amino-functional silicone oil of Example 1 and 29 parts of the nonionic surfactant Trycol TDA-6 (an ethoxylated tridecyl ether from Emery Industries, Maudlin, S.C.). After the appearance of the oil concentrate was noted, a few drops of the oil concentrate were rapidly dispersed in water to form a 5 percent silicone oil emulsion.

| Parts of Water Added to Oil Concentrate | Appearance of Oil Concentrate | Appearance of Final Emulsion |
| --- | --- | --- |
| 16 | Not clear | Opaque |
| 20 | Almost clear | Opaque |
| 23 | Clear | Translucent |
| 24 | Clear | Transparent |
| 25 | Clear | Transparent |
| 27 | Clear | Transparent |

Only the clear oil concentrates gave satisfactorily fine emulsions or microemulsion when diluted in water.

COMPARATIVE EXAMPLE 1

An attempt was made to prepare a small particle size emulsion using the amino-functional silicone (100 parts) of Example 1, 29 parts of Triton X100 (a nonionic surfactant, octylphenoxy polyethoxy (9–10) ethanol, from Rohm and Haas Co.), and 1.4 parts Triton X405. The silicone oil and surfactants formed an opaque mixture which was not rendered clear upon the addition of water. Dilution of the opaque oil concentrate (to form a 5 percent silicone emulsion) in the same manner as earlier examples gave only a coarse, milky dispersion. Substituting Triton X45 (a nonionic surfactant, octylphenoxy polyethoxy (5) ethanol, from Rohm and Hass Co.) for the Triton X100 surfactant gave a similar coarse dispersion.

To form suitable emulsion, as described in this present invention, a surfactant is required that allows the formation of a clear oil concentrate upon the addition of water.

COMPARATIVE EXAMPLE 2

An attempt to prepare a small particle size emulsion was made using the silicone oil described in Example 1 and Tergitol TMN-3 (a nonionic surfactant, trimethyl nonyl polyethylene glycol ether from Union Carbide). Tergitol TMN-3 is soluble in the silicone oil. A mixture of 100 parts of the silicone oil and 29 parts of the surfactant gave a clear mixture without the addition of water. Upon dilution with about 2000 parts $H_2O$ a white coarse emulsion was obtained. Even with 2 and 5 parts of water added to the silicone oil/surfactant mixture, a milky emulsion was obtained upon dilution in about 2000 parts water. To form suitable fine emulsion or microemulsion the surfactant should be insoluble in the silicone oil.

EXAMPLE 8

This example demonstrates the preparation of a microemulsion using a carboxylic acid functional polyorganosilicone. The polyorganosiloxane used can be described by the average formula $(CH_3)_3SiO[(CH_3)_2SiO]_{95}[CH_3QSiO]_3Si(CH_3)_3$ where Q is a monovalent polar radical of formula $-CH_2CH_2SCH_2COOH$. A clear oil concentrate was prepared by adding 5 parts of water to a white opaque mixture of 100 parts of the polyorganosiloxane and 29 parts of the nonionic surfactant Triton X100. The clear oil concentrate was rapidly dispersed in various amounts of water. When dispersed in 2000 parts of water a clear blue microemulsion containing about 5 percent silicone oil with an average particle size of 0.063 microns was obtained. When dispersed in only 66 parts of $H_2O$ a clear blue microemulsion containing about 50 percent silicone oil was obtained. The 50 percent microemulsion was only slightly more viscous than the microemulsion which contained 5 percent silicone oil. After 12 months storage the oil concentrate was still clear and formed a clear blue microemulsion with an average particle size of 0.053 microns when rapidly dispersed in 2000 parts water.

EXAMPLE 9

This example shows the preparation of emulsion using the same polyorganosiloxane of Example 8 with nonionic surfactants from the Triton series. The surfactants used were all octylphenoxy polyethoxy ethanols where the number of polyethoxy (EO) groups vary. Surfactants employed, along with the average number of EO units and their cloud points (for a 1 percent aqueous solution), are given below.

| Surfactant | Av. No. EO Units | Cloud Point (°C.) | HLB |
| --- | --- | --- | --- |
| X15 | 1 | insoluble | 3.6 |
| X35 | 3 | insoluble | 7.8 |
| X45 | 5 | 0 | 10.4 |
| X114 | 7–8 | 22 | 12.4 |
| X100 | 9–10 | 65 | 13.5 |
| X102 | 12–13 | 88 | 14.6 |
| X165 | 16 | 100 | 15.8 |

Mixtures of 100 parts of the carboxylic acid silicone oil and 30 parts of each surfactant (except X35) were prepared, yielding in all cases opaque mixtures. Although X15 is soluble in the silicone oil, the amount of surfactant added exceeded the solubility limits yielding an opaque mixture. Water was added in an attempt to obtain a clear oil concentrate which was then rapidly dispersed in 2000 parts $H_2O$ in order to prepare a 5 percent silicone oil emulsion. The following results were obtained.

| | Oil Concentrate | | Final Emulsion | |
| --- | --- | --- | --- | --- |
| Surfactant | Parts $H_2O$ added | Appearance | Appearance | Particle Size (Microns) |
| X15 | 1–2 | Not clear | very coarse | — |
| X45 | 5 | clear | white | 0.74 |
| X114 | 5 | clear | clear blue | 0.068 |
| X100 | 5 | clear | clear blue | 0.067 |
| X102 | 5 | clear (slight blue) | clear blue | 0.073 |
| X165 | 13* | clear (very slight blue) | translucent | 0.246 |

*Triton X165 is a 70 percent aqueous solution. All the water in the oil concentrate came from the surfactant.

The surfactant X15 did not yield a suitable fine emulsion or microemulsion because (1) the surfactant was soluble in the silicone oil and (2) clear oil concentrate could not be obtained. The oil concentrates (containing X15) with higher levels of water were even less clear and thus less satisfactory. Surfactant X45 did form a clear oil concentrate but did not yield a suitable emulsion since its cloud point (0° C.) is less than the temperature at which the emulsion was prepared. Oil concentrates containing surfactants X114, X100 and X102 all yielded microemulsions using the procedure of this present invention. An oil concentrate with surfactant X165 gave a fine emulsion using the procedure of this invention. It is possible, however that X165 could be employed to prepare microemulsions if the water content of the oil concentrate is reduced.

Several oil concentrates were prepared using combinations of several of the above described Triton surfactants and the carboxylic acid silicone oil. A clear oil concentrate was prepared from 100 parts of the silicone oil, 15 parts Triton X45, and 21.5 parts Triton X165 (15 parts surfactant and 6.5 parts water). Upon rapidly dispersing the oil concentrate in about 2000 parts water, a clear blue microemulsion was obtained with an average particle size of 0.051 microns. Another clear oil concentrate was prepared by mixing 100 parts of the carboxylic acid silicone oil, 15 parts Triton X35 (which is soluble in the oil) and 21.5 parts Triton X165 (which is insoluble in the oil). The 21.5 parts Triton X165 contained 15 parts of the surfactant and 6.5 parts water. Upon rapidly dispersing the clear oil concentrate in 2000 parts of water, a clear blue microemulsion (average particle size 0.072 microns) was obtained.

EXAMPLE 10

This example shows the preparation of a microemulsion with an anionic surfactant. The anionic surfactant used was Aerosol MA-80 (a dihexyl ester of sodium sulfosuccinic acid, 80 percent in water from American Cyanamid Co., Wayne, N.J.). One hundred parts of the carboxylic acid containing polyorganosiloxane of Example 8 and 36 parts of the Aerosol MA-80 solution were combined to form a clear oil concentrate. The oil concentrate contained 28.8 parts of the actual surfactant and 7.2 parts of water from the surfactant solution. When diluted in 2000 parts of water under conditions to insure rapid dispersion an excellent microemulsion containing about 5 percent silicone was obtained.

After 11 months of room temperature storage the oil concentrate was still clear and, upon rapid dilution of the oil concentrate in about 2000 parts water, a clear blue microemulsion was obtained (average particle size of 0.088 microns).

EXAMPLE 11

This example shows the use of an anionic phosphate ester surfactant to prepare the emulsions of this invention. The polyorganosiloxane used was the carboxylic acid functional siloxane as described in Example 8. The phosphate ester was GAFAC LO-529 from GAF Corporation, New York, N.Y. This phosphate ester is the sodium salt of complex organic phosphate esters of general formula $RO(CH_2CH_2O)_n$—$PO(ONa)_2$ and $[RO(CH_2CH_2O)_n]_2$—$PO(ONa)$ where R is an alkylaryl radical. The GAFAC LO-529 surfactant contains about 12 percent water. A clear oil concentrate was prepared from 100 parts of the polyorganosiloxane oil and 40 parts GAFAC LO-529 (35.2 parts surfactant and 4.8 parts water). Upon rapidly dispersing the oil concentrate in about 2000 parts water, a clear blue microemulsion was obtained.

EXAMPLE 12

This example demonstrates the preparation of emulsions having an average particle size less than 0.3 microns using silicone oils having widely differing degrees of polymerization. The silicone oils used had a general formula of $(CH_3)_3SiO[(CH_3)_2SiO]_x[CH_3QSiO]_ySi(CH_3)_3$ where Q is the amino-functional radical —$CH_2CH(CH_3)CH_2NHCH_2CH_2NH_2$. One hundred parts of the silicone oil was mixed with 30 parts of Triton X100 nonionic surfactant to give an opaque mixture. Sufficient water was added to the silicone oil and surfactant mixture to give a clear oil concentrate. The oil concentrate was dispersed rapidly by hand shaking in 2000 parts of water to form an emulsion with a silicon oil content of about 5 percent.

The first silicone oil had a degree of polymerization of 50, that is (x+y) equals 48, and about 4.5 mol percent of amino-functional groups. The second silicone oil had a degree of polymerization of 200 and about 5 mol percent of amino-functional groups. The third silicone oil had a degree of polymerization of 300, about 5 mol percent amino-functional groups, and a viscosity of 32,000 cs at 25° C. The oil concentrate prepared from the 300 degree of polymerization siloxane was very viscous and gel-like. Emulsions were prepared with the following results.

| Degree of Polymerization | x | y | Appearance | Particle Size (Microns) |
|---|---|---|---|---|
| 50 | 45.75 | 2.25 | clear blue | — |
| 200 | 188 | 10 | clear blue | 0.070 |
| 300 | 283 | 15 | translucent | 0.198 |

The silicone oils with a degree of polymerization of 50 and 200 both formed excellent microemulsions. The 300 degree of polymerization silicone oil only formed a fine emulsion. Because of the viscous nature of the 300 degree of polymerization siloxane oil concentrate it was very difficult to disperse rapidly in the water by shaking the mixture by hand. Another sample of the 300 degree of polymerization silicone oil concentrate was added to water and immediately placed in an ultrasonic bath for 5 minutes. The emulsion obtained had an average particle size of 0.145 microns. A sample of this same oil concentrate (300 degree of polymerization siloxane) was kept at room temperature for six weeks at which time it was noted that the oil concentrate was still clear with a much reduced viscosity. Upon rapidly diluting this aged oil concentrate in water and shaking by hand, a microemulsion (average particle size of 0.038 microns) was obtained.

EXAMPLE 13

A clear oil concentrate was prepared by first mixing 100 parts of an amino-functional polyorganosiloxane of average formula $(CH_3)_3SiO[(CH_3)_2SiO]_{47.5}[CH_3QSiO]_{0.5}Si(CH_3)_3$ where Q is an amino-functional monovalent radical of general structure —$CH_2CH(CH_3)CH_2NHCH_2CH_2NH_2$ and 25 parts of a nonionic surfactant Tergitol 15-S-5 (polyethylene glycol ether of a linear alcohol (11 to 15 carbon atoms) from Union Carbide Corporation) to form an opaque mixture to which was added 17 parts of water. As one skilled in the art realizes from the average formula above, which contains only one-half unit of ($CH_3QSiO$), this example also illustrates the preparation of microemulsions which contain polyorganosiloxanes which contain polar groups in combination of polyorganosiloxanes without such polar groups. One portion of the clear oil concentrate was rapidly dispersed in about 2000 parts water to form a translucent emulsion. Another portion of the clear oil concentrate was rapidly dispersed in 1765 parts of water containing 93 parts of Triton X405 surfactant. A microemulsion containing about 5 percent silicone with an average particle size of 0.106 microns was formed.

Another microemulsion was prepared using a polyorganosiloxane of general formula

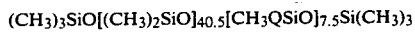

where Q is an amino-functional radical —$CH_2CH(CH_3)CH_2NHCH_2CH_2NH_2$. One hundred parts of the silicone oil was mixed with 42.8 parts of Triton X305 nonionic surfactant (a 70 percent aqueous solution of octylphenoxy polyethoxy ethanol from Rohm and Haas Co.) to form a white, opaque mixture. Water (10.6 parts) was then added to form a clear oil concentrate. The oil concentrate contained a total of 23.4 parts water. The oil concentrate was rapidly dispersed in about 2000 parts of water to form a clear blue microemulsion with an average particle size of 0.085 microns.

EXAMPLE 14

This examples shows the preparation of a microemulsion of a reaction product obtained by cold blending several reactive silicones or silanes. The silicone oil is the reaction product of 75 percent hydroxyl endblocked polydimethylsiloxane fluid of viscosity about 35 cs at 25° C. which contains about 4 percent SiOH groups, 15 percent of $(CH_3O)_3Si(CH_2)_3NH(CH_2)_2NH_2$, and 10 percent of $CH_3Si(OCH_3)_3$. One hundred parts of the silicone oil were mixed with 29 parts of Triton X100 nonionic surfactant to form a white opaque mixture. Upon the addition of 12 parts of water the white opaque mixture yielded a clear oil concentrate. The oil concentrate was rapidly dispersed into various amounts of $H_2O$ which in some cases also included Triton X405 surfactant.

| Water (parts) | X405 (parts) | Particle Size (Microns) | Approximate Silicone Content (%) |
|---|---|---|---|
| 1860 | 0 | 0.065 | 5 |
| 1812 | 48 | 0.049 | 5 |
| 1764 | 96 | 0.046 | 5 |
| 764 | 96 | 0.047 | 10 |
| 330 | 30 | 0.049 | 20 |
| 300 | 27 | 0.1* | 20 |

*Estimated from the appearance of the clear microemulsion.

The 20 percent silicone microemulsion prepared with 330 parts water and 30 parts Triton X405 was further tested. The microemulsion was kept at 55° C. for 7 days with no change in appearance with a final average particle size of 0.053 microns. Upon the addition of ethylene glycol (1%) the microemulsion was stable through a minimum of 5 freeze/thaw cycles. After 5 freeze/thaw cycles the average particle size was 0.052 microns. Without the ethylene glycol present, the microemulsion broke after only one freeze/thaw cycle. One freeze/thaw cycle consists of freezing the emulsion at −20° C. for about 18 hours and then thawing it at room temperature for about 6 hours.

A similar 5% silicone microemulsion, which was prepared by adding an oil concentrate consisting of 100 parts of the silicone oil, 57 parts of Triton X100, and 26 parts of water to a mixture containing 1721 parts of water and 96 parts of Triton X405, had an average particle size of 0.031 microns.

EXAMPLE 15

This example shows the use of cationic surfactants to prepare microemulsions from amino-functional siloxanes. The polyorganosiloxane employed was of the average general formula

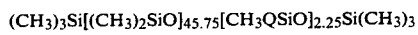

where Q is —$CH_2CH(CH_3)CH_2NHCH_2CH_2NH_2$. A mixture of the amino-functional siloxane (100 parts) and the cationic surfactant Ethoquad C/12 (30 parts) was opaque with some flocculation. Ethoquad C/12 is a polyethoxylated quaternary ammonium salt from Armak Co., Chicago, Ill. Upon adding 4 parts of water a clear oil concentrate was obtained. When the oil concentrate was diluted rapidly in about 2000 parts water, a translucent blue microemulsion was obtained. When the same oil concentrate was diluted rapidly in about 2000 parts of water containing 100 parts of Triton X405 a clear blue microemulsion with an average particle size of 0.057 microns was obtained. This clear oil concentrate remained clear for at least 5 months at room temperature. The aged clear oil concentrate yielded a clear blue microemulsion with an average particle size of 0.061 microns when rapidly dispersed in about 2000 parts water.

Another clear oil concentrate was prepared by adding 3 parts of water to an opaque mixture of 100 parts of the amino-functional siloxane and 30 parts of the cationic surfactant Ethomeen C/15 (a tertiary amine obtained as the ethylene oxide condensation product of primary fatty amines from Armak Co.). The oil concentrate yielded a clear blue microemulsion when rapidly dispersed into about 2000 parts of water containing about 100 parts Triton X405.

EXAMPLE 16

This example demonstrates the preparation of microemulsions with polyorganosiloxane containing amide groups. The first polyorganosiloxane employed had the average formula

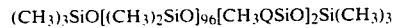

where Q is

A clear oil concentrate was obtained by adding 24 parts water to a viscous, opaque (whitish) mixture containing the amide-functional siloxane (100 parts) and Triton X100 (30 parts). The oil concentrate when rapidly dispersed in about 2000 parts of water gave a microemulsion containing about 5 percent siloxane with an average particle size of 0.084 microns. When the oil concentrate was rapidly dispersed in 845 parts water the resulting 10 percent siloxane microemulsion had an average particle size of 0.076 microns.

The second polyorganosiloxane had the general formula $(CH_3)_3SiO[(CH_3)_2SiO]_{95}[CH_3QSiO]_3Si(CH_3)_3$ where Q was $-CH_2CH_2SCH_2\overset{\overset{O}{\|}}{C}NH(CH_2CH_2CH_2CH_3).$ A mixture of 100 parts of the polyorganosiloxane and 30 parts of Tergitol 15-S-7 (a polyethyene glycool ether of a linear alcohol from Union Carbide Corporation) formed an opaque mixture. Upon the addition of 13 parts water, a clear oil concentrate was obtained. Upon the rapid dilution of 7.2 g of the oil concentrate into 16.2 g of water which contained 1.6 g Triton X405 surfactant, a clear yellow-blue microemulsion was obtained. The microemulsion had an average particle size of 0.042 microns.

EXAMPLE 17

This example illustrates the formation of microemulsion of a polyorganosiloxane which contains a lithium salt of a carboxylic acid. This example also illustrates the use of a silicon glycol surfactant in the oil concentrate. The polyorganosiloxane can be described by the average formula $(CH_3)_3SiO[(CH_3)_2SiO]_{97}[CH_3QSiO]_1Si(CH_3)_3$ where Q is the monovalent radical —CH$_2$CH$_2$SCH$_2$COOLi. The silicone glycol surfactant is polyethylene (7) bis(trimethylsiloxy)methylsilyl propyl ether. A clear oil concentrate was prepared by adding 8 parts of water to an opaque mixture of 100 parts of the polyorganosiloxane and 30 parts of the silicone glycol surfactant. Upon rapidly dispersing the oil concentrate in about 2000 parts water a clear blue microemulsion was obtained.

EXAMPLE 18

This example demonstrates the preparation of a microemulsion from a polyorganosiloxane which contains polycarbinol groups. The polyorganosiloxane may be represented by the average formula $(CH_3)_3SiO[(CH_3)_2SiO]_{67}[CH_3QSiO]_3Si(CH_3)_3$ where Q is —(CH$_2$)$_3$O[CH$_2$CH(CH$_3$)O]$_{2.5}$H. A white opaque mixture was obtained by mixing 100 parts of the polyorganosiloxane and 43 parts of the silicon glycol surfactant described in Example 17. A clear oil concentrate was obtained by adding 10 parts of water to the opaque mixture. Upon rapid dipersion of the oil concentrate into a mixture containing 1799 parts water and 48 parts Triton X405, a translucent microemulsion was obtained.

EXAMPLE 19

In this example a microemulsion containing hydroxyl-endblocked polydimethylsiloxane is prepared. The polydimethylsiloxane was endblocked with silanol groups of formula —Si(CH$_3$)$_2$OH. A hazy mixture was obtained by mixing 100 parts of a hydroxyl-endblocked polydimethylsiloxane (viscosity of about 65 cs at 25° C.) and 40 parts of the silicone glycol surfactant described in Example 17. A clear colorless oil concentrate was obtained upon addition of 20 parts of water. Upon rapidly dispersing the oil concentrate in about 1500 parts of water containing about 80 parts of Triton X405, a microemulsion with an average particle size of 0.095 microns was obtained. When the oil concentrate was rapidly dispersed in about 650 parts of water containing about 80 parts of Triton X405, a microemulsion containing about 10 percent silicone with an average particle size of 0.090 microns was obtained.

EXAMPLE 20

This example demonstrates the use of a polyorganosiloxane which contains a polar radical with two different polar substituents. The polyorganosiloxane is illustrated by the average formula $(CH_3)_3SiO[(CH_3)_2SiO]_{96}[CH_3QSiO]_2Si(CH_3)_3$ where Q is $-CH_2CH(CH_3)CH_2NH(CH_2CH_2NH(\overset{\overset{O}{\|}}{C}CH_3)).$ A mixture containing 100 parts of the polyorganosiloxane and 30 parts of Tergitol 15-S-7 nonionic surfactant was opaque. Upon the addition of 18 parts water a clear oil concentrate was obtained. The oil concentrate was rapidly dispersed in 320 parts water and 31 parts Triton X405. A clear, yellow-blue microemulsion (average particle size of 0.041 microns) was obtained which contained about 20 percent polyorganosiloxane.

EXAMPLE 21

This example illustrates the preparation of a microemulsion from a polyorganosiloxane containing monoorganosiloxane units. The polyorganosiloxane was prepared by blending 15 parts (CH$_3$O)$_3$Si(CH$_2$)$_3$NH(CH$_2$)$_2$NH$_2$ and 85 parts of a siloxane (viscosity: 120 cs) which contained 22 percent CH$_3$SiO$_{3/2}$ units, 77 percent (CH$_3$)$_2$SiO units, and 1.5 percent SiOH groups. The blended mixture was aged about 2 hours. The resulting reaction product contained, on the average, about 10 percent NH$_2$CH$_2$CH$_2$NH(CH$_2$)$_3$SiO$_{3/2}$ units, 20 percent CH$_3$SiO$_{3/2}$ units and 70 percent (CH$_3$)$_2$SiO units. One hundred parts of the polyorganosiloxane reaction product and 30 parts of Triton X100 formed an opaque, white mixture. Upon adding 14 parts water, a clear oil concentrate was obtained. A clear blue microemulsion was formed when the oil concentrate was rapidly dispersed in about 2000 parts water.

EXAMPLE 22

This example demonstrates the prepration of a microemulsion from an amino-functional vinylmethylpolysiloxane. The polysiloxane was prepared by mixing 85 parts of a vinylmethylsiloxane fluid HO(CH$_3$(CH$_2$=CH)SiO)$_x$H where x averages about 8 (viscosity of about 30 cs at 25° C.) and 15 parts of (CH$_3$O)$_3$Si(CH$_2$)$_3$NH(CH$_2$)$_2$NH$_2$. The resulting amino-functional vinylmethylpolysiloxane (100 parts), upon being mixed with 30 parts of Triton X102 surfactant, formed an opaque mixture. Upon the addition of 5 parts water a clear, colorless oil concentrate was obtained.

When the clear oil concentrate was rapidly dispersed in 2000 parts water, a clear blue microemulsion with an average particle size of 0.032 microns was obtained.

EXAMPLE 23

This example demonstrates the preparation of fine emulsions and microemulsions using a polar group containing polyorganosiloxane which is diluted with a polyorganosiloxane which does not contain polar groups. The polar group containing polyorganosiloxane can be described by the average formula $(CH_3)_3SiO[(CH_3)_2SiO]_{96}[CH_3QSi]_2Si(CH_3)_3$ where Q is $-CH_2CH(CH_3)CH_2NHCH_2CH_2NH_2$.

In a first series of experiments the polyorganosiloxane diluent without polar groups was dimethylsiloxane cyclics which mainly consisted of the cyclic tetramer, $[(CH_3)_2SiO]_4$. A mixture of 90 parts of the amino-functional siloxane, 10 parts of the dimethylsiloxane cyclics, and 30 parts of Tergitol TMN-6 surfactant gave an opaque mixture which, upon the addition of 18 parts water, gave a clear oil concentrate. Upon rapidly dispersing the oil concentrate in about 2000 parts of water a clear blue microemulsion was obtained.

Another clear oil concentrate was prepared by adding 18 parts of water to a white, opaque mixture containing 80 parts of the amino-functional siloxane, 20 parts of dimethylsiloxane cyclics, and 30 parts of Tergitol TMN-6. Upon rapid dispersion of the oil concentrate in water a fine emulsion was obtained.

Another polyorganosiloxane diluent without polar groups was a phenyl containing siloxane which contained about 60 percent $(CH_3)_3SiO_{\frac{1}{2}}$ units and about 40 percent $C_6H_5SiO_{\frac{3}{2}}$ units. Eighty parts of the amino-functional siloxane, 20 parts of the phenyl containing siloxane, and 30 parts of Tergitol TMN-60 produced an opaque, white mixture. Upon addition of 12 parts water a clear oil concentrate was obtained. Upon addition of the clear oil concentrate to about 2000 parts water and 100 parts Triton X405, a translucent microemulsion with an average particle size of about 0.1 microns (estimated) was obtained.

EXAMPLE 24

This example illustrates the stability of various microemulsions of this invention when incorporated into shampoo bases or subjected to various treatments. The shampoo base used was Standapol ES-3, a 28 percent aqueous solution of sodium lauryl ether sulfate from Henkel Inc., Hoboken, N.J. Several microemulsions were mixed with the shampoo base in a ratio of 1 to 1 by volume and stored at ambient temperatures for extended lengths of time. Mixtures prepared using the microemulsion of Example 5 (20 percent siloxane), Example 8 (5 percent siloxane) and Example 14 (10 percent siloxane) were stable for a minimum of seven months. A mixture prepared with the microemulsion of Example 3 (prepared at 23° C.) and Standapol ES-3 was stable for a minimum of four months.

The microemulsion of Example 14 (5 percent siloxane with an average particle size of 0.031 microns) was mixed (1 to 1 by volume) with a 2 percent aqueous solution of Methocel E4M, a hydroxypropyl methyl cellulose thickening agent from Dow Chemical Co., Midland, Mich. The microemulsion was indeed thicker but remained clear. The thickened microemulsion was unchanged and stable for a minimum of seven months.

A few drops of concentrated HCl were added to a small volume of the microemulsion of Example 14 (5 percent siloxane with an average particle size of 0.031 microns). There was no change in the microemulsion even after several days.

Microemulsions were also prepared from the amino function silicone and Tergitol TMN-6 of Example 1 in the presence of the electrolyte $MgCl_2$. A clear oil concentrate was prepared from 100 parts of the aminofunctional silicone, 30 parts of Tergitol TMN-6, and 17 parts water. A clear blue microemulsion was obtained when the clear oil concentrate was rapidly dispersed in either about 1900 parts water or about 1900 parts water containing 2 percent $MgCl_2$. Another clear oil concentrate was prepared from 100 parts of the same amino-functional silicone, 30 parts Tergitol TMN-6, 16.7 parts water, and 0.3 parts $MgCl_2$. Upon rapid dilution of the $MgCl_2$ containing oil concentrate in about 1900 parts water, a clear blue microemulsion was obtained.

That which is claimed is:

1. A process for preparing a polyorganosiloxane emulsion of the oil-in-water type, said process comprising
   (A) forming a translucent oil concentrate by
      (1) mixing a polyorganosiloxane with at least one surfactant where said polyorganosiloxane contains at least one polar radical attached to silicon through Si—C or Si—O—C bonds or at least one silanol radical where said polyorganosiloxane is liquid at the temperature of mixing, and where at least one of said surfactants is insoluble in said polyorganosiloxane at the temperature of mixing; and
      (2) adding water to the polyorganosiloxane and surfactant mixture of step (1) where water is added in an amount sufficient to produce a translucent oil concentrate; and
   (B) forming a polyorganosiloxane emulsion of the oil-in-water by rapidly dispersing said translucent oil concentrate in water where the average particle size of said polyorganosiloxane in said emulsion is less than 0.14 micron.

2. A process as defined in claim 1 wherein said translucent oil concentrate is transparent.

3. A process as defined in claim 1 wherein said polyorganosiloxane contains siloxane units of general formula $$R_aQ_bSiO_{(4-a-b)/2}$$

and $$R_cSiO_{(4-c)/2}$$

wherein
   a is from 0 to 2;
   b is from 1 to 3;
   c is from 1 to 3; and
   the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxyl radical; and wherein said insoluble surfactant is present in an amount sufficient to provide at least one monomolecular layer of said insoluble surfactant for said polyorganosiloxane in said emulsion formed in step (B).

4. A process as defined in claim 2 wherein said polyorganosiloxane contains siloxane units of general formula $$R_a Q_b SiO_{(4-a-b)/2}$$

and $$R_c SiO_{(4-c)/2}$$

wherein
a is from 0 to 2;
b is from 1 to 3;
c is from 1 to 3; and
the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxy radical; and wherein said insoluble surfactant is present in an amount sufficient to provide at least one monomolecular layer of said insoluble surfactant for said polyorganosiloxane in said emulsion formed in step (B).

5. A process as defined in claim 3 wherein said polyorganosiloxane is of the general formula $$R_{(3-d)}Q_d SiO(R_2SiO)_x(RQSiO)_y SiR_{(3-d')}Q_{d'}$$

wherein
d is 0, 1, 2, or 3;
d' is 0, 1, 2, or 3;
the sum (y+d+d') is greater than or equal to 1; and
the sum (x+y) is less than about 500; and
wherein R is a monovalent hydrocarbon radical containing from 1 to 18 carbon atoms.

6. A process as defined in claim 4 wherein said polyorganosiloxane is of the general formula $$R_{(3-d)}Q_d SiO(R_2SiO)_x(RQSiO)_y SiR_{(3-d')}Q_{d'}$$

wherein
d is 0, 1, 2, or 3;
d' is 0, 1, 2, or 3;
the sum (y+d+d') is greater than or equal to 1; and
the sum (x+y) is less than about 500; and
wherein R is a monovalent hydrocarbon radical containing from 1 to 18 carbon atoms.

7. A process as defined in claim 5 wherein both d and d' are 0, R is selected from the group consisting of methyl, phenyl, and vinyl radicals, and Q is attached to silicon through a Si—C bond.

8. A process as defined in claim 6 wherein both d and d' are 0, R is selected from the group consisting of methyl, phenyl, and vinyl radicals, and Q is attached to silicon through a Si—C bond.

9. A process as defined in claim 8 wherein said insoluble surfactant is present at a level of 10 to 200 parts by weight per 100 parts by weight of said polyorganosiloxane; wherein said insoluble surfactant has a hydrophilic-lipophilic balance value greater than about 8 and is selected from the group consisting of octylphenoxy polyethoxy ethanols, trimethylnonyl polyethylene glycol ethers, polyethylene glycol ethers of linear 11-15 carbon atom containing alcohols, ethoxylated tridecyl ethers, alkali metal salts of dialkyl sulfosuccinates, polyethoxylated quaternary salts, ethylene oxide condensation products of the primary fatty amines, alkoxylated siloxanes containing ethylene oxide units, and alkoxylated siloxanes containing ethylene oxide and propylene oxide units; and wherein said polyorganosiloxane contains from 1 to 15 molar percent of siloxane units which contain said polar radical Q.

10. A process as defined in claim 9 wherein said insoluble surfactant is present at a level of 20 to 40 parts by weight per 100 parts by weight polyorganosiloxane and wherein said polyorganosiloxane contains from 2 to 10 molar percent of siloxane units which contain said polar radical Q.

11. A process as defined in claim 8 wherein said polar radical Q is an amine radical of general formula $$-R'NHR^2$$

where R' is a divalent linking group composed of carbon and hydrogen atoms; carbon, hydrogen, and oxygen atoms; or carbon, hydrogen, and sulfur atoms; where R' contains from 2 to 10 carbon atoms; and where $R^2$ is selected from the group consisting of hydrogen atoms, alkyl radicals containing from 1 to 4 carbon atoms, and the $-CH_2CH_2NH_2$ radical.

12. A process as defined in claim 8 wherein said polar radical Q contains an amine salt substituent.

13. A process as defied in claim 8 wherein said polar radical Q is an amide radical of general formula $$-R'N(\overset{O}{\overset{\|}{C}}R^3)R^4$$

where R' is a divalent linking group composed of carbon and hydrogen atoms; carbon, hydrogen, and oxygen atoms; or carbon, hydrogen, and sulfur atoms; where R' contains from 2 to 10 carbon atoms; where $R^3$ is a monovalent alkyl radical containing from 1 to 6 carbon atoms; and where $R^4$ is selected from the group consisting of hydrogen, alkyl radicals containing 1 to 4 carbon atoms, and $$-CH_2CH_2NH(\overset{O}{\overset{\|}{C}}R^3).$$

14. A process as defined in claim 8 wherein said polar radical Q is a carbinol radical of general formula $$-R'O(C_2H_4O)_e(C_3H_6O)_fH$$

where R' is a divalent linking group composed of carbon and hydrogen atoms; carbon, hydrogen, and oxygen atoms; or carbon, hydrogen, and sulfur atoms; where R' contains from 2 to 10 carbon atoms; and where e and f are, independently, greater than or equal to 0.

15. A process as defined in claim 8 wherein said polar radical Q is a carboxylic acid radical of general formula $$-R'COOH$$

where R' is a divalent linking group composed of carbon and hydrogen atoms; carbon, hydrogen, and oxygen atoms; or carbon, hydrogen, and sulfur atoms; and where R' contains 2 to 10 carbon atoms.

16. A process as defined in claim 8 wherein said polar radical Q contains a carboxylic acid salt substituent.

17. A process as defined in claim 8 wherein said polar radical Q contains a phenol substituent.

18. A process as defined in claim 8 wherein said polar radical Q contains a sulfonic acid salt substituent.

19. A process as defined in claim 8 wherein said polar radical Q contains a sulfate salt substituent.

20. A process as defined in claim 8 wherein said polar radical Q contains a phosphate acid substituent.

21. A process as defined in claim 8 wherein said polar radical Q contains a phosphate acid salt substituent.

22. A process as defined in claim 8 wherein said polar radical Q is a hydroxyl radical.

23. A polyorganosiloxane emulsion of the oil-in-water type as prepared by the process of claim 1.

24. A polyorganosiloxane emulsion of the oil-in-water type as prepared by the process of claim 2.

25. A polyorganosiloxane emulsion of the oil-in-water type as prepared by the process of claim 3.

26. A polyorganosiloxane emulsion of the oil-in-water type as prepared by the process of claim 4.

27. A polyorganosiloxane emulsion of the oil-in-water type as prepared by the process of claim 7.

28. A polyorganosiloxane emulsion of the oil-in-water type as prepared by the process of claim 8.

29. A polyorganosiloxane emulsion of the oil-in-water type as prepared by the process of claim 10.

30. A process for preparing a polyorganosiloxane emulsion of the oil-in-water type, said process comprising (A) forming a translucent oil concentrate by mixing a polyorganosiloxane, at least one surfactant, and water where said polyorganosiloxane contains at least one polar radical attached to Si through Si—C or Si—O—C bonds or at least one silanol radical, where said polyorganosiloxane is liquid at the temperature of mixing, where at least one of said surfactants is insoluble in said polyorganosiloxane at the temperature of mixing, and where water is present in an amount sufficient to produce a translucent oil concentrate; and (B) forming a polyorganosiloxane emulsion of the oil-in-water type by rapidly dispersing said translucent oil concentrate in water where the average particle size of said polyorganosiloxane in said emulsion is less than 0.14 micron.

31. A process as defined in claim 30 wherein said translucent oil concentrate is transparent.

32. A process as defined in claim 30 wherein said polyorganosiloxane contains siloxane units of general formula

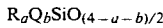

and

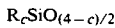

wherein
a is from 0 to 2;
b is from 1 to 3;
c is from 1 to 3; and
the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxyl radical; and wherein said insoluble surfactant is present in an amount sufficient to provide at least one monomolecular layer of said insoluble surfactant for said polyorganosiloxane in said emulsion formed in step (B).

33. A process as defined in claim 31 wherein said polyorganosiloxane contains siloxane units of general formula

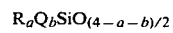

and

wherein
a is from 0 to 2;
b is from 1 to 3;
c is from 1 to 3; and
the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxyl radical; and wherein said insoluble surfactant is present in an amount sufficient to provide at least one monomolecular layer of said insoluble surfactant for said polyorganosiloxane in said emulsion formed in step (B).

34. A process as defined in claim 32 wherein said polyorganosiloxane is of general formula

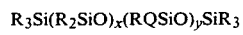

wherein y is greater than or equal to 1 and the sum (x+y) is sufficiently small to allow for the rapid dispersion of the translucent oil concentrate in step (B).

35. A process as defined in claim 33 wherein said polyorganosiloxane is of general formula

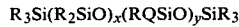

wherein y is greater than or equal to 1 and the sum (x+y) is sufficiently small to allow for the rapid dispersion of the transparent oil concentrate in step (B).

36. A process as defined in claim 34 wherein R in said polyorganosiloxane is selected from the group consisting of methyl, phenyl, and vinyl radicals; wherein Q is attached to silicon through a Si—C bond; wherein said insoluble surfactant is present at a level of 10 to 200 parts by weight per 100 parts of said polyorganosiloxane; wherein said insoluble surfactant has a hydrophilic-lipophilic balance value greater than 8 and is selected from the group consisting of octylphenoxy polyethoxy ethanols, trimethylnonyl polyethylene glycol ethers, polyethylene glycol ethers of linear 11–15 carbon atom containing alcohols, ethoxylated tridecyl ethers, alkali metal salts of dialkyl sulfosuccinates, polyethoxylated quaternary salts, ethylene oxide condensation products of the primary fatty amines, alkoxylated siloxanes containing ethylene oxide units and alkoxylated siloxanes containing ethylene oxide units and propylene oxide units; and wherein said polyorganosiloxane contains from 1 to 15 molar percent of siloxane units which contain said polar radical Q.

37. A process as defined in claim 35 wherein R in said polyorganosiloxane is selected from the group consisting of methyl, phenyl, and vinyl radicals; wherein Q is attached to silicon through a Si—C bond; wherein said insoluble surfactant is present at a level of 10 to 200 parts by weight per 100 parts of said polyorganosiloxane; wherein said insoluble surfactant has a hydrophilic-lipophilic balance value greater than 8 and is selected from the group consisting of octylphenoxy polyethoxy ethanols, trimethylnonyl polyethylene glycol ethers, polyethylene glycol ethers of linear 11-15 carbon atom containing alcohols, ethoxylated tridecyl ethers, alkali metal salts of dialkyl sulfosuccinates, polyethoxylated quaternary salts, ethylene oxide condensation products of the primary fatty amines, alkoxylated siloxanes containing ethylene oxide units and alkoxylated siloxanes containing ethylene oxide units and propylene oxide units; and wherein said polyorganosiloxane contains from 1 to 15 molar percent of siloxane units which contain said polar radical Q.

38. A process as defined in claim 37 wherein said said insoluble surfactant is present at a level of 20 to 40 parts by weight per 100 parts by weight polyorganosiloxane; wherein said polyorganosiloxane contains from 2 to 10 molar percent of siloxane units which contain said polar radical Q; and wherein said polar radical Q is —CH$_2$CH$_2$CH$_2$NHCH$_2$CH$_2$NH$_2$ or —CH$_2$CH(CH$_3$)CH$_2$NHCH$_2$CH$_2$NH$_2$.

39. A process as defined in claim 37 wherein said said insoluble surfactant is present at a level of 20 to 40 parts by weight per 100 parts by weight polyorganosiloxane; wherein said polyorganosiloxane contains from 2 to 10 molar percent of siloxane units which contain said polar radical Q; and wherein said polar radical Q is

or

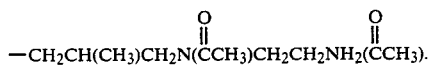

40. A process as defined in claim 37 wherein said insoluble surfactant is present at a level of 20 to 40 parts by weight per 100 parts by weight polyorganosiloxane; wherein said polyorganosiloxane contains from 2 to 10 molar percent of siloxane units which contain said polar radical Q; and wherein said polar radical Q is —CH$_2$CH$_2$SCH$_2$COOH or —CH$_2$CH$_2$SCH$_2$COOX where X is selected from the group consisting of Na$^+$, K$^+$, Li$^+$, and NH$_4^+$.

41. A process as defined in claim 37 wherein said said insoluble surfactant is present at a level of 20 to 40 parts by weight per 100 parts by weight polyorganosiloxane; wherein said polyorganosiloxane contains from 2 to 10 molar percent of siloxane units which contain said polar radical Q; and wherein said polar radical Q is a hydroxyl radical.

42. A polyorganosiloxane emulsion of the oil-in-water type as prepared by the process of claim 30.

43. A polyorganosiloxane emulsion of the oil-in-water type as prepared by the process of claim 31.

44. A polyorganosiloxane emulsion of the oil-in-water type as prepared by the process of claim 34.

45. A polyorganosiloxane emulsion of the oil-in-water type as prepared by the process of claim 35.

46. A polyorganosiloxane emulsion of the oil-in-water type as prepared by the process of claim 36.

47. A polyorganosiloxane emulsion of the oil-in-water type as prepared by the process of claim 37.

48. A polyorganosiloxane emulsion of the oil-in-water type as prepared by the process of claim 38.

49. A polyorganosiloxane emulsion of the oil-in-water type as prepared by the process of claim 39.

50. A polyorganosiloxane emulsion of the oil-in-water type as prepared by the process of claim 40.

51. A polyorganosiloxane emulsion of the oil-in-water type as prepared by the process of claim 41.

52. An oil concentrate comprising
(A) a polyorganosiloxane which contains at least one polar radical attached to Si through Si—C or Si—O—C bonds or at least one silanol radical,
(B) a surfactant which is insoluble in said polyorganosiloxane
where said polyorganosiloxane and said surfactant form an opaque mixture, and
(C) a sufficient amount of water to produce a translucent mixture; wherein said oil concentrate, when rapidly dispersed in water, will produce a polyorganosiloxane emulsion of the oil-in-water type with an average particle size of said polyorganosiloxane in said emulsion of less than 0.14 micron.

53. An oil concentrate as described in claim 52 wherein water is present in a mount sufficient to produce a transparent mixture.

54. An oil concentrate as defined in claim 52 wherein said polyorganosiloxane contains siloxane units of general formula

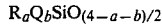

and

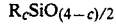

wherein
a is from 0 to 2;
b is from 1 to 3;
c is from 1 to 3; and
the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxyl radical; and wherein said insoluble surfactant is present in an amount sufficient to provide at least one monomolecular layer of said insoluble surfactant for said polyorganosiloxane in said emulsion formed in step (B).

55. An oil concentrate as defined in claim 53 wherein said polyorganosiloxane contains siloxane units of general formula

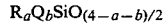

and $$R_cSiO_{(4-c)/2}$$

wherein
a is from 0 to 2;
b is from 1 to 3;
c is from 1 to 3; and
the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxyl radical; and wherein said insoluble surfactant is present in an amount sufficient to provide at least one monomolecular layer of said insoluble surfactant for said polyorganosiloxane in said emulsion formed in step (B).

56. An oil concentrate as defined in claim 54 wherein said polyorganosiloxane is of the general formula $$R_{(3-d)}Q_dSiO(R_2SiO)_x(RQSiO)_ySiR_{(3-d')}Q_{d'}$$

wherein
d is 0, 1, 2, or 3;
d' is 0, 1, 2, or b 3;
the sum (y+d+d') is greater than or equal to 1; and
the sum (x+y) is less than about 500; and
wherein R is a monovalent hydrocarbon radical containing from 1 to 18 carbon atoms.

57. An oil concentrate as defined in claim 54 wherein said polyorganosiloxane is of general formula $$R_3Si(R_2SiO)_x(RQSiO)_ySiR_3$$

wherein y is greater than or equal to 1 and the sum (x+y) is sufficiently small to allow for the rapid dispersion of the translucent oil concentrate is step (B).

58. An oil concentrate as defined in claim 55 wherein said polyorganosiloxane is of general formula $$R_3Si(R_2SiO)_x(RQSiO)_ySiR_3$$

wherein y is greater than or equal to 1 and the sum (x+y) is sufficiently small to allow for the rapid dispersion of the translucent oil concentrate is step (B).

59. An oil concentrate as defined in claim 57 wherein said insoluble surfactant is present at a level of 10 to 200 parts by weight per 100 parts by weight of said polyorganosiloxane; wherein said insoluble surfactant has a hydrophilic-lipophilic balance value greater than about 8 and is selected from the group consisting of octylphenoxy polyethoxy ethanols, trimethylnonyl polyethylene glycol ethers, polyethylene glycol ethers of linear 11-15 carbon atom containing alcohols, ethoxylated tridecyl ethers, alkali metal salts of dialkyl sulfosuccinates, polyethoxylated quaternary salts, ethylene oxide condensation products of the primary fatty amines, alkoxylated siloxanes containing ethylene oxide units, and alkoxylated siloxanes containing ethylene oxide and propylene oxide units; and wherein said polyorganosiloxane contains from 1 to 15 molar percent of siloxane units which contain said polar radical Q.

60. An oil concentrate as defined in claim 58 wherein said insoluble surfactant is present at a level of 10 to 200 parts by weight per 100 parts by weight of said polyorganosiloxane; wherein said insoluble surfactant has a hydrophilic-lipophilic balance value greater than about 8 and is selected from the group consisting of octylphenoxy polyethoxy ethanols, trimethylnonyl polyethylene glycol ethers, polyethylene glycol ethers of linear 11-15 carbon atom containing alcohols, ethoxylated tridecyl ethers, alkali metal salts of dialkyl sulfosuccinates, polyethoxylated quaternary salts, ethylene oxide condensation products of the primary fatty amines, alkoxylated siloxanes containing ethylene oxide units, and alkoxylated siloxanes containing ethylene oxide and propylene oxide units; and wherein said polyorganosiloxane contains from 1 to 15 molar percent of siloxane units which contain said polar radical Q.

61. An oil concentrate as defined in claim 60 wherein said polar radical Q is an amine radical of general formula $$-R'NHR^2$$

where R' is a divalent linking group composed of carbon and hydrogen atoms; carbon, hydrogen, and oxygen atoms; or carbon, hydrogen, and sulfur atoms; where R' contains from 2 to 10 carbon atoms; and where $R^2$ is selected from the group consisting of hydrogen atoms, alkyl radicals containing from 1 to 4 carbon atoms, and the $-CH_2CH_2NH_2$ radical.

62. An oil concentrate as defined in claim 60 wherein said polar radical Q contains an amine salt substituent.

63. An oil concentrate as defined in claim 60 wherein said polar radical Q is an amide radical of general formula $$-R'N(CR^3)R^4 \quad \text{with } O \text{ double-bonded to } C$$

where R' is a divalent linking group composed of carbon and hydrogen atoms; carbon, hydrogen, and oxygen atoms; or carbon, hydrogen, and sulfur atoms; where R' contains from 2 to 10 carbon atoms; where $R^3$ is a monovalent alkyl radical containing from 1 to 6 carbon atoms; and where $R^4$ is selected from the group consisting of hydrogen, alkyl radicals containing 1 to 4 carbon atoms, and $$-CH_2CH_2NH(CR^3) \quad \text{with } O \text{ double-bonded to } C.$$

64. An oil concentrate as defined in claim 60 wherein said polar radical Q is a carbinol radical of general formula $$-R'O(C_2H_4O)_e(C_3H_6O)_fH$$

where R' is a divalent linking group composed of carbon and hydrogen atoms; carbon, hydrogen, and oxygen atoms; or carbon, hydrogen, and sulfur atoms; where R' contains from 2 to 10 carbon atoms; and where e and f are independently, greater than or equal to 0.

65. An oil concentrate as defined in claim 60 wherein said polar radical Q is a carboxylic acid radical of general formula $$-R'COOH$$

where R' is a divalent linking group composed of carbon and hydrogen atoms; carbon, hydrogen, and oxygen atoms; or carbon, hydrogen, and sulfur atoms; and where R' contains 2 to 10 carbon atoms.

66. An oil concentrate as defined in claim 60 wherein said polar radical Q contains a carboxylic acid salt substituent.

67. An oil concentrate as defined in claim 60 wherein said polar radical Q contains a phenol substituent.

68. An oil concentrate as defined in claim 60 wherein said polar radical Q contains a sulfonic acid salt substituent.

69. An oil concentrate as defined in claim 60 wherein said polar radical Q contains a sulfate salt substituent.

70. An oil concentrate as defined in claim 60 wherein said polar radical Q contains a phosphate acid substituent.

71. An oil concentrate as defined in claim 60 wherein said polar radical Q contains a phosphate acid salt substituent.

72. An oil concentrate as defined in claim 60 wherein said polar radical Q is a hydroxyl radical.

73. A polyorganosiloxane microemulsion of the oil-in-water type consisting essentially of
(A) a polyorganosiloxane which contains at least one polar radical attached to Si through Si—C or Si—O—C bonds or at least one silanol radical,
(B) a surfactant which is insoluble in said polyorganosiloxane, and
(C) water
wherein said polyorganosiloxane is the disperse phase and water is the continuous phase, wherein said polyorganosiloxane in said microemulsion has an average particle size of less than 0.14 microns and wherein said polyorganosiloxane microemulsion is transparent.

74. A polyorganosiloxane microemulsion as defined in claim 73 wherein said polyorganosiloxane contains siloxane units of general formula $$R_aQ_bSiO_{(4-a-b)/2}$$

and $$R_cSiO_{(4-c)/2}$$

wherein
a is from 0 to 2;
b is from 1 to 3;
c is from 1 to 3; and
the sum (a+b) is from 1 to 3;
wherein R is a monovalent hydrocarbon or substituted hydrocarbon radical and Q is a polar radical attached to silicon through Si—C or Si—O—C bonds where Q contains at least one substituent selected from the group consisting of amines, amine salts, amides, carboxylic acids, carboxylic acid salts, carbinols, phenols, sulfonic acid salts, sulfate salts, phosphate acids, and phosphate acid salts or Q is a hydroxyl radical; and wherein said insoluble surfactant is present in an amount sufficient to provide at least one monomolecular layer of said insoluble surfactant for said polyorganosiloxane in said emulsion formed in step (B).

75. A polyorganosiloxane microemulsion as defined in claim 74 wherein said polyorganosiloxane is of the general formula $$R_{(3-d)}Q_dSiO(R_2SiO)_x(RQSiO)_ySiR_{(3-d')}Q_{d'}$$

wherein
d is 0, 1, 2, or 3;
d' is 0, 1, 2, or 3;
the sum (y+d+d') is greater than or equal to 1; and
the sum (x+y) is less than about 500; and
wherein R is a monovalent hydrocarbon radical containing from 1 to 18 carbon atoms.

76. A polyorganosiloxane microemulsion as defined in claim 75 wherein both d and d' are 0, R is selected from the group consisting of methyl, phenyl, and vinyl radicals, and Q is attached to silicon through a Si—C bond.

77. A polyorganosiloxane microemulsion as defined in claim 76 wherein said insoluble surfactant is present at a level of 10 to 200 parts by weight per 100 parts by weight of said polyorganosiloxane; wherein said insoluble surfactant has a hydrophilic-lipophilic balance value greater than about 8 and is selected from the group consisting of octylphenoxy polyethoxy ethanols, trimethylnonyl polyethylene glycol ethers, polyethylene glycol ethers of linear 11-15 carbon atom containing alcohols, ethoxylated tridecyl ethers, alkali metal salts of dialkyl sulfosuccinates, polyethoxylated quaternary salts, ethylene oxide condensation products of the primary fatty amines, alkoxylated siloxanes containing ethylene oxide units, and alkoxylated siloxanes containing ethylene oxide and propylene oxide units; and wherein said polyorganosiloxane contains from 1 to 15 molar percent of siloxane units which contain said polar radical Q.

78. A polyorganosiloxane microemulsion as defined in claim 77 wherein said insoluble surfactant is present at a level of 10 to 40 parts by weight per 100 parts by weight polyorganosiloxane and wherein said polyorganosiloxane contains from 2 to 10 molar percent of siloxane units which contain said polar radical Q.

79. A polyorganosiloxane microemulsion as defined in claim 74 wherein said polyorganosiloxane microemulsion contains from about 5 to 55 weight percent of said polyorganosiloxane based on the total weight of said polyorganosiloxane microemulsion.

80. A polyorganosiloxane microemulsion as defined in claim 74 wherein said polyorganosiloxane microemulsion contains from about 10 to 40 weight percent of said polyorganosiloxane based on the total weight of said polyorganosiloxane microemulsion.

81. A polyorganosiloxane microemulsion as defined in claim 75 wherein said polyorganosiloxane microemulsion contains from about 5 to 55 weight percent of said polyorganosiloxane based on the total weight of said polyorganosiloxane microemulsion.

82. A polyorganosiloxane microemulsion as defined in claim 75 wherein said polyorganosiloxane microemulsion contains from about 10 to 40 weight percent of said polyorganosiloxane based on the total weight of said polyorganosiloxane microemulsion.

83. A polyorganosiloxane microemulsion as defined in claim 76 wherein said polyorgansiloxane microemulsion contains from about 10 to 40 weight percent of said polyorganosiloxane based on the total weight of said polyorganosiloxane microemulsion.

84. A polyorganosiloxane microemulsion as defined in claim 77 wherein said polyorganosiloxane microemulsion contains from about 10 to 40 weight percent of said polyorganosiloxane based on the total weight of said polyorganosiloxane microemulsion.

85. A polyorganosiloxane microemulsion as defined in claim 78 wherein said polyorganosiloxane microemulsion contains from about 10 to 40 weight percent of said polyorganosiloxane based on the total weight of said polyorganosiloxane microemulsion.

86. A polyorganosiloxane microemulsion as defined in claim 83 wherein said polar radical Q is an amine radical of general formula

—R'NHR$^2$ where R' is a divalent linking group composed of carbon and hydrogen atoms; carbon, hydrogen, and oxygen atoms; or carbon, hydrogen, and sulfur atoms; where R' contains from 2 to 10 carbon atoms; and where R$^2$ is selected from the group consisting of hydrogen atoms, alkyl radicals containing from 1 to 4 carbon atoms, and the —CH$_2$CH$_2$NH$_2$ radical.

87. A polyorganosiloxane microemulsion as defined in claim 83 wherein said polar radical Q contains an amine salt substituent.

88. A polyorganosiloxane microemulsion as defined in claim 83 wherein said polar radical Q is an amide radical of general formula $$-\text{R'N}(\overset{\overset{\text{O}}{\|}}{\text{C}}\text{R}^3)\text{R}^4$$

where R' is a divalent linking group composed of carbon and hydrogen atoms; carbon, hydrogen, and oxygen atoms; or carbon, hydrogen, and sulfur atoms; where R' contains from 2 to 10 carbon atoms; where R$^3$ is a monovalent alkyl radical containing from 1 to 6 carbon atoms; and where R$^4$ is selected from the group consisting of hydrogen, alkyl radicals containing 1 to 4 carbon atoms, and $$-\text{CH}_2\text{CH}_2\text{NH}(\overset{\overset{\text{O}}{\|}}{\text{C}}\text{R}^3).$$

89. A polyorganosiloxane microemulsion as defined in claim 84 wherein said polar radical Q is a carbinol radical of general formula —R'O(C$_2$H$_4$O)$_e$(C$_3$H$_6$O)$_f$H where R' is a divalent linking group composed of carbon and hydrogen atoms; carbon, hydrogen, and oxygen atoms; or carbon, hydrogen, and sulfur atoms; where R' contains from 2 to 10 carbon atoms; and where e and f are independently, greater than or equal to 0.

90. A polyorganosiloxane microemulsion as defined in claim 83 wherein said polar radical Q is a carboxylic acid radical of general formula

—R'COOH where R' is a divalent linking group composed of carbon and hydrogen atoms; carbon, hydrogen, and oxygen atoms; or carbon, hydrogen, and sulfur atoms; and where R' contains 2 to 10 carbon atoms.

91. A polyorganosiloxane microemulsion as defined in claim 83 wherein said polar radical Q contains a carboxylic acid salt substituent.

92. A polyorganosiloxane microemulsion as defined in claim 83 wherein said polar radical Q contains a phenol substituent.

93. A polyorganosiloxane microemulsion as defined in claim 83 wherein said polar radical Q contains a sulfonic acid salt substituent.

94. A polyorganosiloxane microemulsion as defined in claim 83 wherein said polar radical Q contains a sulfate salt substituent.

95. A polyorganosiloxane microemulsion as defined in claim 83 wherein said polar radical Q contains a phosphate acid substituent.

96. A polyorganosiloxane microemulsion as defined in claim 83 wherein said polar radical Q contains a phosphate acid salt substituent.

97. A polyorganosiloxane microemulsion as defined in claim 83 wherein said polar radical Q is a hydroxyl radical.

* * * * *